US012675595B2

(12) United States Patent
Krishnan

(10) Patent No.: US 12,675,595 B2
(45) Date of Patent: Jul. 7, 2026

(54) INCREMENTAL SECURITY PROTECTION GENERATION

(71) Applicant: Oracle International Corporation, Redwood Shores, CA (US)

(72) Inventor: Padmanabhan Krishnan, Brisbane (AU)

(73) Assignee: Oracle International Corporation, Redwood Shores, CA (US)

(*) Notice: Subject to any disclaimer, the term of this patent is extended or adjusted under 35 U.S.C. 154(b) by 37 days.

(21) Appl. No.: 18/817,168

(22) Filed: Aug. 27, 2024

(65) Prior Publication Data

US 2026/0064873 A1     Mar. 5, 2026

(51) Int. Cl.
G06F 21/62          (2013.01)
G06F 21/60          (2013.01)

(52) U.S. Cl.
CPC ........ G06F 21/6227 (2013.01); G06F 21/604 (2013.01); G06F 2221/2141 (2013.01)

(58) Field of Classification Search
CPC ............... G06F 21/6227; G06F 21/604; G06F 2221/2141
See application file for complete search history.

(56) References Cited

U.S. PATENT DOCUMENTS 8,046,374 B1 * 10/2011 Bromwich ............ G06F 21/552
                                              707/952
11,113,269 B1 * 9/2021 Andrade Garcia ... G06F 16/211

12,111,916 B2 * 10/2024 Al-Mousa ............... H04L 67/56
2015/0019584 A1 * 1/2015 Berg ...................... G06F 16/245
                                                       707/769
2019/0207974 A1 * 7/2019 Jas .................... G06F 16/24565
2022/0207002 A1 * 6/2022 Zhou ................... G06F 16/2255

OTHER PUBLICATIONS

Bogdan Alexe, Balder ten Cate, Phokion G. Kolaitis, and Wang-Chiew Tan. "Eirene: Interactive Design and Refinement of Schema Mappings via Data Examples" Proc. VLDB Endow., 4(12):1414-1417, Aug. 1, 2011, 5 pages.

(Continued)

*Primary Examiner* — Khanh B Pham
(74) *Attorney, Agent, or Firm* — Lathrop GPM LLP

(57)          ABSTRACT

A method implements incremental security protection generation. The method includes adding an incremental column to a table including an initial set of columns to form an updated set of columns. The initial set of columns include a status for at least one column of the initial set of columns. The method further includes adding a predicate to an allowlist for the incremental column. The method further includes transitioning the status of the incremental column from corresponding to a learning phase to corresponding to an enforcement phase responsive to a switch factor of the incremental column. The method further includes sending an access query including an access command, to access the incremental column, to a database in response to checking the access command against the allowlist with the status of the incremental column corresponding to the enforcement phase.

20 Claims, 7 Drawing Sheets

(56) References Cited

OTHER PUBLICATIONS

Kassem Bagher and Shangqi Lai. "SGX-Stream: A Secure Stream Analytics Framework in SGX-enabled Edge Cloud". Journal of Information Security and Applications, https://www.sciencedirect.com/science/article/abs/pii/S2214212622002472, Feb. 1, 2023, 10 pages.

Yan Chen, Ashwin Machanavajjhala, Michael Hay, and Gerome Miklau. "PeGaSus: Data-Adaptive Differentially Private Stream Processing" In ACM SIGSAC Conference on Computer and Communications Security, pp. 1375-1388. Association for Computing Machinery, Oct. 30-Nov. 3, 2017, 14 pages.

Michael de Jong, et al., "Zero-Downtime SQL Database Schema Evolution for Continuous Deployment", MS Thesis, May 1, 2017, 15 pages.

S. Gulwani, J. Hernandez-Orallo, E. Kitzelmann, S. H. Muggleton, U. Schmid, and B. G. Zorn. "Inductive Programming Meets the Real World", Communication of the ACM, Jan. 1, 2015, 9 pages.

Andy Maule, Wolfgang Emmerich, and David Rosenblum. "Impact Analysis of Database Schema Changes", In ACM/IEEE 30th International Conference on Software Engineering, pp. 451-460, May 10-18, 2008, 11 pages.

Rimma V. Nehme, Hyo-Sang Lim, Elisa Bertino, and Elke A. Rundensteiner. "StreamShield: A Stream-Centric Approach Towards Security and Privacy in Data Stream Environments", In Acm Sigmod International Conference on Management of Data, pp. 1027-1030. Association for Computing Machinery, Jun. 29-Jul. 2, 2009, 3 pages.

K. Vorobyov, F. Gauthier, and P. Krishnan. "Synthesis of Allowlists for Runtime Protection against SQLi", In ICSE (NIER), Apr. 14-20, 2024, 5 pages.

Yuepeng Wang, Rushi Shah, Abby Criswell, Rong Pan, and Isil Dillig. "Data Migration using Datalog Program Synthesis", Proc. VLDB Endow., 13(7):1006-1019, Mar. 3, 2020, 14 pages.

Xing Xie, Indrakshi Ray, Raman Adaikkalavan, and Rose Gamble. "Information Flow Control for Stream Processing in Clouds", In 18th ACM Symposium on Access Control Models and Technologies, SACMAT, pp. 89-100, New York, NY, USA, Jun. 12-14, 2013, 12 pages.

* cited by examiner

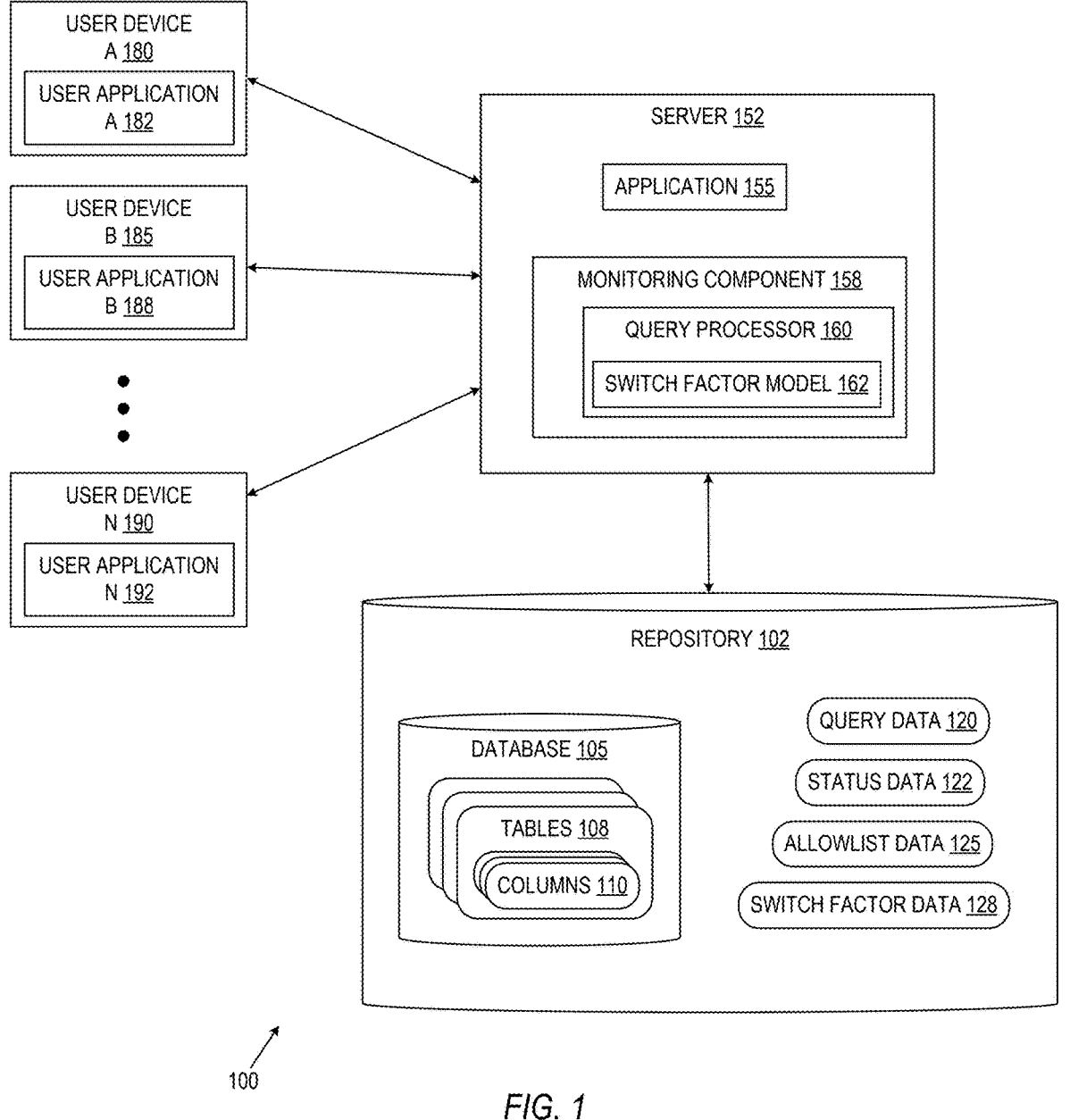
_FIG. 1_

| QUERY 401 | SWITCHING FACTOR (4) (QUERY COUNT) 403 | ALLOWLIST 405 | STATUS 407 |
|---|---|---|---|
| SELECT a $\varphi_{a1}$ 409 | (1, 1, ⊥, ⊥) 411 | a ↦ $\varphi_{a1}$ 413 | (L, L, ⊥, ⊥) 415 |
| SELECT b $\varphi_b$ 417 | (2, 2, ⊥, ⊥) 419 | a ↦ $\varphi_{a1}$, b ↦ $\varphi_b$ 421 | (L, L, ⊥, ⊥) 423 |
| ADD COLUMN c 425 | (3, 3, 3, ⊥) 427 | a ↦ $\varphi_{a1}$, b ↦ $\varphi_b$ 429 | (L, L, L, ⊥) 431 |
| SELECT a $\varphi_{a2}$ 433 | (4, 4, 4, ⊥) 435 | a ↦ $\varphi_{a1} \lor \varphi_{a2}$, b ↦ $\varphi_b$, c ↦ ff 437 | (E, E, E, ⊥) 439 |
| ADD COLUMN d 441 | (4, 4, 4, 0) 443 | a ↦ $\varphi_{a1} \lor \varphi_{a2}$, b ↦ $\varphi_b$, c ↦ ff 445 | (E, E, E, L) 447 |
| SELECT a $\phi_1$ 449 | (4, 4, 4, 1) 451 | a ↦ $\varphi_{a1} \lor \varphi_{a2}$, b ↦ $\varphi_b$, c ↦ ff 453 | (E, E, E, L) 455 |
| SELECT b $\phi_2$ 457 | (4, 4, 4, 2) 459 | a ↦ $\varphi_{a1} \lor \varphi_{a2}$, b ↦ $\varphi_b$, c ↦ ff 461 | (E, E, E, L) 463 |
| SELECT c $\phi_3$ 465 | (4, 4, 4, 3) 467 | a ↦ $\varphi_{a1} \lor \varphi_{a2}$, b ↦ $\varphi_b$, c ↦ ff 469 | (E, E, E, L) 471 |
| SELECT d $\varphi_d$ 473 | (4, 4, 4, 4) 475 | a ↦ $\varphi_{a1} \lor \varphi_{a2}$, b ↦ $\varphi_b$, c ↦ ff, d ↦ $\varphi_d$ 477 | (E, E, E, E) 479 |
| DROP COLUMN c 481 | (4, 4, ⊥, 4) 483 | a ↦ $\varphi_{a1} \lor \varphi_{a2}$, b ↦ $\varphi_{a1}$, d ↦ $\varphi_d$ 485 | (E, E, ⊥, E) 487 |

400

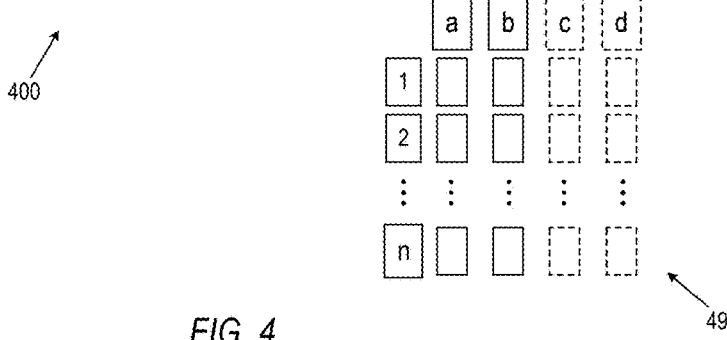

| QUERY 501 | SWITCHING FACTOR (11) (TIME BASED COUNT) 503 | ALLOWLIST 505 | STATUS 507 |
|---|---|---|---|
| SELECT a $\varphi_{a1}$ 509 | $(1, 1, \perp, \perp)$ 511 | $a \mapsto \varphi_{a1}$ 513 | $(L, L, \perp, \perp)$ 515 |
| SELECT b $\varphi_b$ 517 | $(3, 3, \perp, \perp)$ 519 | $a \mapsto \varphi_{a1}, b \mapsto \varphi_b$ 521 | $(L, L, \perp, \perp)$ 523 |
| DROP b 525 | $(5, \perp, \perp, \perp)$ 527 | $a \mapsto \varphi_{a1}, b \mapsto \mathbf{ff}$ 529 | $(L, \perp, \perp, \perp)$ 531 |
| ADD c 533 | $(7, \perp, 7, \perp)$ 535 | $a \mapsto \varphi_{a1}, b \mapsto \mathbf{ff}$ 537 | $(L, \perp, L, \perp)$ 539 |
| SELECT a $\varphi_{a2}$ 541 | $(11, \perp, 11, \perp)$ 543 | $a \mapsto \varphi_{a1} \vee \varphi_{a2}, b \mapsto \mathbf{ff}$ 545 | $(E, \perp, E, \perp)$ 547 |
| ADD d 549 | $(12, \perp, 12, 0)$ 551 | $a \mapsto \varphi_{a1} \vee \varphi_{a2}, b \mapsto \mathbf{ff}$ 553 | $(E, \perp, E, L)$ 555 |
| SELECT d $\varphi_{d1}$ 557 | $(15, \perp, 15, 3)$ 559 | $a \mapsto \varphi_{a1} \vee \varphi_{a2}, b \mapsto \mathbf{ff}, d \mapsto \varphi_{d1}$ 561 | $(E, \perp, E, L)$ 563 |
| SELECT a $\phi_a$ 565 | $(19, \perp, 19, 7)$ 567 | $a \mapsto \varphi_{a1} \vee \varphi_{a2}, b \mapsto \mathbf{ff}, d \mapsto \varphi_{d1}$ 569 | $(E, \perp, E, L)$ 571 |
| SELECT d $\varphi_{d2}$ 573 | $(23, \perp, 23, 11)$ 575 | $a \mapsto \varphi_{a1} \vee \varphi_{a2}, b \mapsto \mathbf{ff}, d \mapsto \varphi_{d1} \vee \varphi_{a2}$ 577 | $(E, \perp, E, E)$ 579 |
| DROP d 581 | $(28, \perp, 28, \perp)$ 583 | $a \mapsto \varphi_{a1} \vee \varphi_{a2}, b \mapsto \mathbf{ff}, d \mapsto \mathbf{ff}$ 585 | $(E, \perp, E, \perp)$ 587 |
| CREATE VIEW 589 | $(30, \perp, 30, \perp)$ 591 | $a \mapsto \varphi_{a1} \vee \varphi_{a2}, b \mapsto \mathbf{ff}, d \mapsto \mathbf{ff}$ 593 | $(E, \perp, E, \perp)$ 595 |

Figure 6:
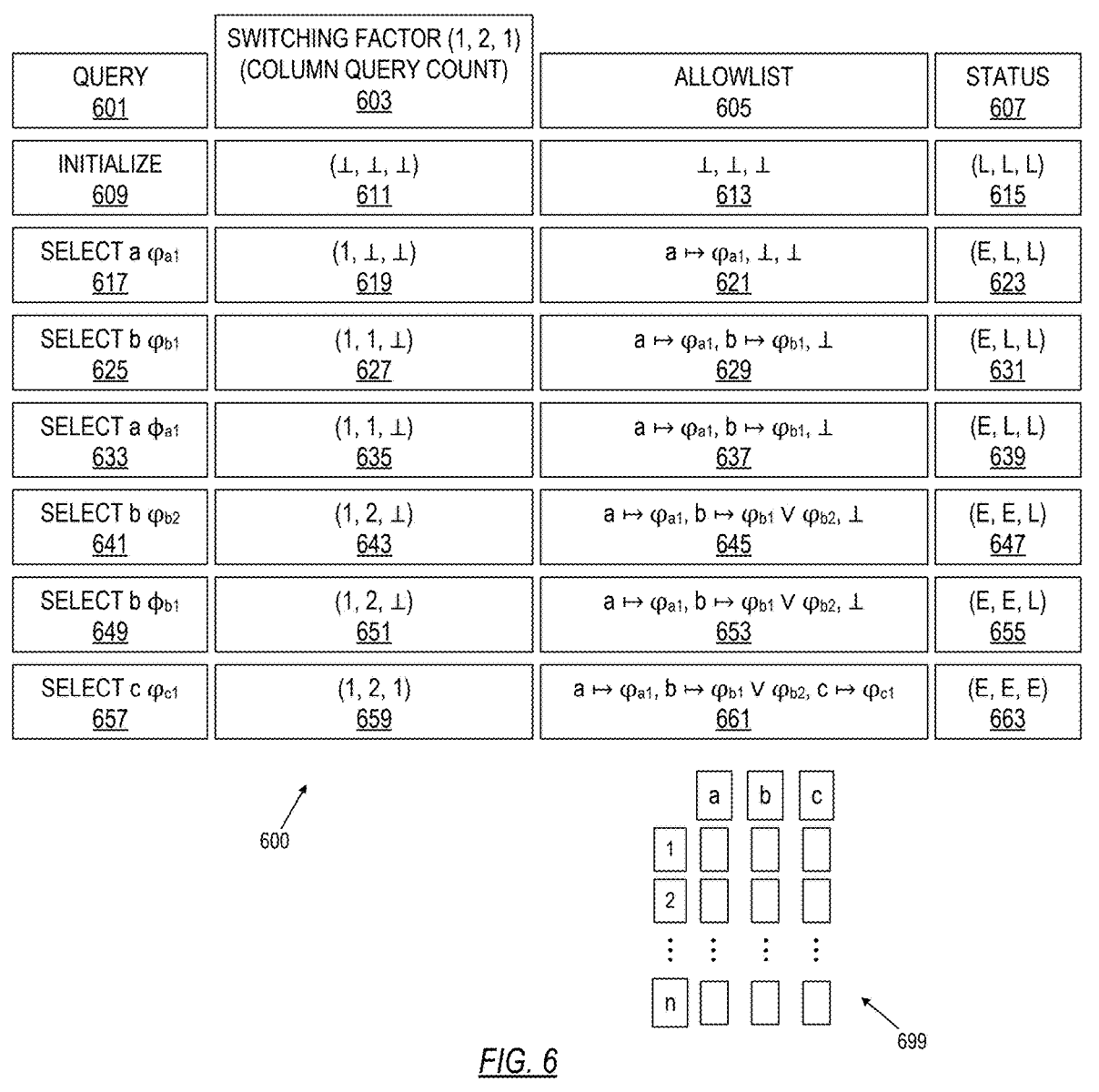

| QUERY 601 | SWITCHING FACTOR (1, 2, 1) (COLUMN QUERY COUNT) 603 | ALLOWLIST 605 | STATUS 607 |
|---|---|---|---|
| INITIALIZE 609 | $(\perp, \perp, \perp)$ 611 | $\perp, \perp, \perp$ 613 | (L, L, L) 615 |
| SELECT a $\varphi_{a1}$ 617 | $(1, \perp, \perp)$ 619 | $a \mapsto \varphi_{a1}, \perp, \perp$ 621 | (E, L, L) 623 |
| SELECT b $\varphi_{b1}$ 625 | $(1, 1, \perp)$ 627 | $a \mapsto \varphi_{a1}, b \mapsto \varphi_{b1}, \perp$ 629 | (E, L, L) 631 |
| SELECT a $\varphi_{a1}$ 633 | $(1, 1, \perp)$ 635 | $a \mapsto \varphi_{a1}, b \mapsto \varphi_{b1}, \perp$ 637 | (E, L, L) 639 |
| SELECT b $\varphi_{b2}$ 641 | $(1, 2, \perp)$ 643 | $a \mapsto \varphi_{a1}, b \mapsto \varphi_{b1} \vee \varphi_{b2}, \perp$ 645 | (E, E, L) 647 |
| SELECT b $\varphi_{b1}$ 649 | $(1, 2, \perp)$ 651 | $a \mapsto \varphi_{a1}, b \mapsto \varphi_{b1} \vee \varphi_{b2}, \perp$ 653 | (E, E, L) 655 |
| SELECT c $\varphi_{c1}$ 657 | $(1, 2, 1)$ 659 | $a \mapsto \varphi_{a1}, b \mapsto \varphi_{b1} \vee \varphi_{b2}, c \mapsto \varphi_{c1}$ 661 | (E, E, E) 663 |

600

| | a | b | c |
|---|---|---|---|
| 1 | | | |
| 2 | | | |
| ⋮ | ⋮ | ⋮ | ⋮ |
| n | | | |

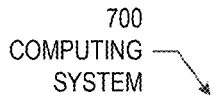
700
COMPUTING
SYSTEM
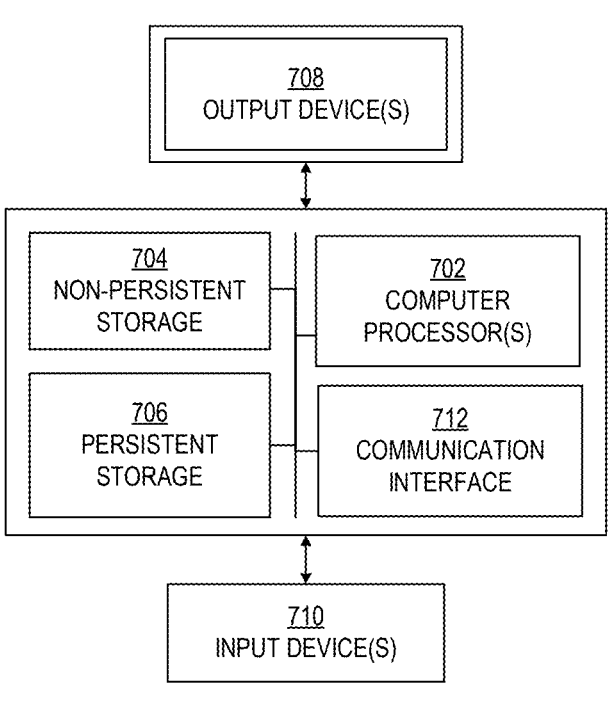
708
OUTPUT DEVICE(S)
704
NON-PERSISTENT
STORAGE
702
COMPUTER
PROCESSOR(S)
706
PERSISTENT
STORAGE
712
COMMUNICATION
INTERFACE
710
INPUT DEVICE(S)
*FIG. 7A*
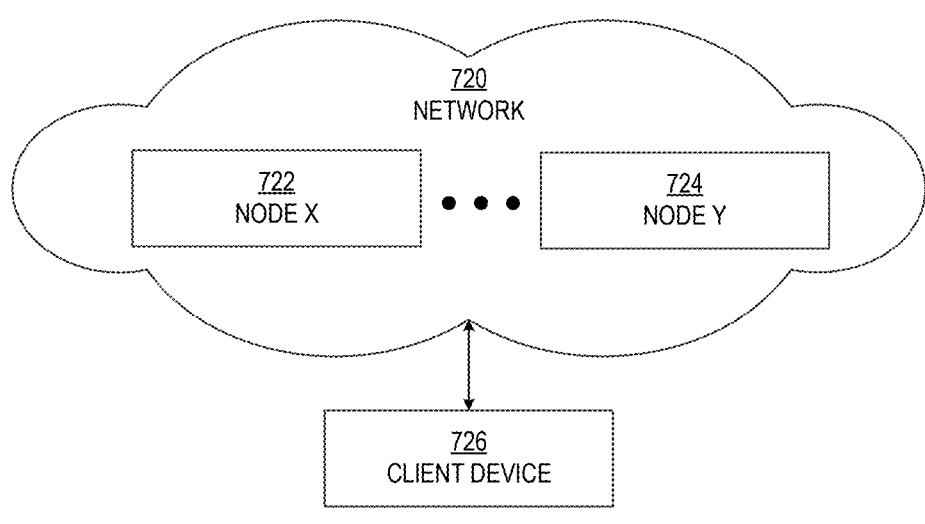
720
NETWORK
722
NODE X
724
NODE Y
726
CLIENT DEVICE
*FIG. 7B*

INCREMENTAL SECURITY PROTECTION GENERATION

BACKGROUND

The columns and types of values in a database are defined by the schema of the database. There is a close relationship between a software application (referred to as an application and written in a programming language such as Java and using a Java database controller (JDBC) driver) and the database. The software application may be aware of or trigger changes to the structure of the database. The changes affect the security protections associated at the application level, such as runtime application self-protection (RASP) solutions. The runtime application self-protection may change in conjunction with the changes to the schema. The runtime application self-protection may operate in a learning phase where the system learns, from the application, the queries that are expected to be passed to the database. After the learning phase, an enforcement phase may be utilized to enforce what was learned during the learning phase. A challenge is that when a table is created or a column is added to an existing table, the columns in the created table or added to the existing table may not be accessible to applications since the tables and columns were not part of the database during the learning phase.

SUMMARY

In general, in one or more aspects, the disclosure relates to a method implementing incremental security protection generation. The method includes adding an incremental column to a table including an initial set of columns to form an updated set of columns. The initial set of columns include a status for at least one column of the initial set of columns. The status for the at least one column of the initial set of columns corresponds to an enforcement phase. The incremental column includes a status of the incremental column corresponding to a learning phase. The method further includes adding a predicate to an allowlist for the incremental column. The status of the incremental column corresponds to the learning phase and the status for the at least one column of the initial set of columns corresponds to the enforcement phase. The method further includes transitioning the status of the incremental column from corresponding to the learning phase to corresponding to the enforcement phase responsive to a switch factor of the incremental column. The method further includes sending an access query including an access command, to access the incremental column, to a database in response to checking the access command against the allowlist with the status of the incremental column corresponding to the enforcement phase.

In general, in one or more aspects, the disclosure relates to a system that includes at least one processor and an application that executes on the at least one processor. Executing the application performs adding an incremental column to a table including an initial set of columns to form an updated set of columns. The initial set of columns include a status for at least one column of the initial set of columns. The status for the at least one column of the initial set of columns corresponds to an enforcement phase. The incremental column includes a status of the incremental column corresponding to a learning phase. Executing the application performs adding a predicate to an allowlist for the incremental column. The status of the incremental column corresponds to the learning phase and the status for the at least one column of the initial set of columns corresponds to the enforcement phase. Executing the application performs transitioning the status of the incremental column from corresponding to the learning phase to corresponding to the enforcement phase responsive to a switch factor of the incremental column. Executing the application performs sending an access query including an access command, to access the incremental column, to a database in response to checking the access command against the allowlist with the status of the incremental column corresponding to the enforcement phase.

In general, in one or more aspects, the disclosure relates to a non-transitory computer readable medium including instructions executable by at least one processor. Executing the instructions performs adding an incremental column to a table including an initial set of columns to form an updated set of columns. The initial set of columns include a status for at least one column of the initial set of columns. The status for the at least one column of the initial set of columns corresponds to an enforcement phase. The incremental column includes a status of the incremental column corresponding to a learning phase. Executing the instructions performs adding a predicate to an allowlist for the incremental column. The status of the incremental column corresponds to the learning phase and the status for the at least one column of the initial set of columns corresponds to the enforcement phase. Executing the instructions performs transitioning the status of the incremental column from corresponding to the learning phase to corresponding to the enforcement phase responsive to a switch factor of the incremental column. Executing the instructions performs sending an access query including an access command, to access the incremental column, to a database in response to checking the access command against the allowlist with the status of the incremental column corresponding to the enforcement phase.

Other aspects of one or more embodiments may be apparent from the following description and the appended claims.

BRIEF DESCRIPTION OF DRAWINGS

FIG. 1 and FIG. 2 show diagrams in accordance with one or more embodiments of the disclosure.

FIG. 4, FIG. 5, and FIG. 6 show examples in accordance with one or more embodiments of the disclosure.

FIG. 7A and FIG. 7B show computing systems in accordance with one or more embodiments.

Similar elements in the various figures are denoted by similar names and reference numerals. The features and elements described in one figure may extend to similarly named features and elements in different figures.

DETAILED DESCRIPTION

Figure 2:
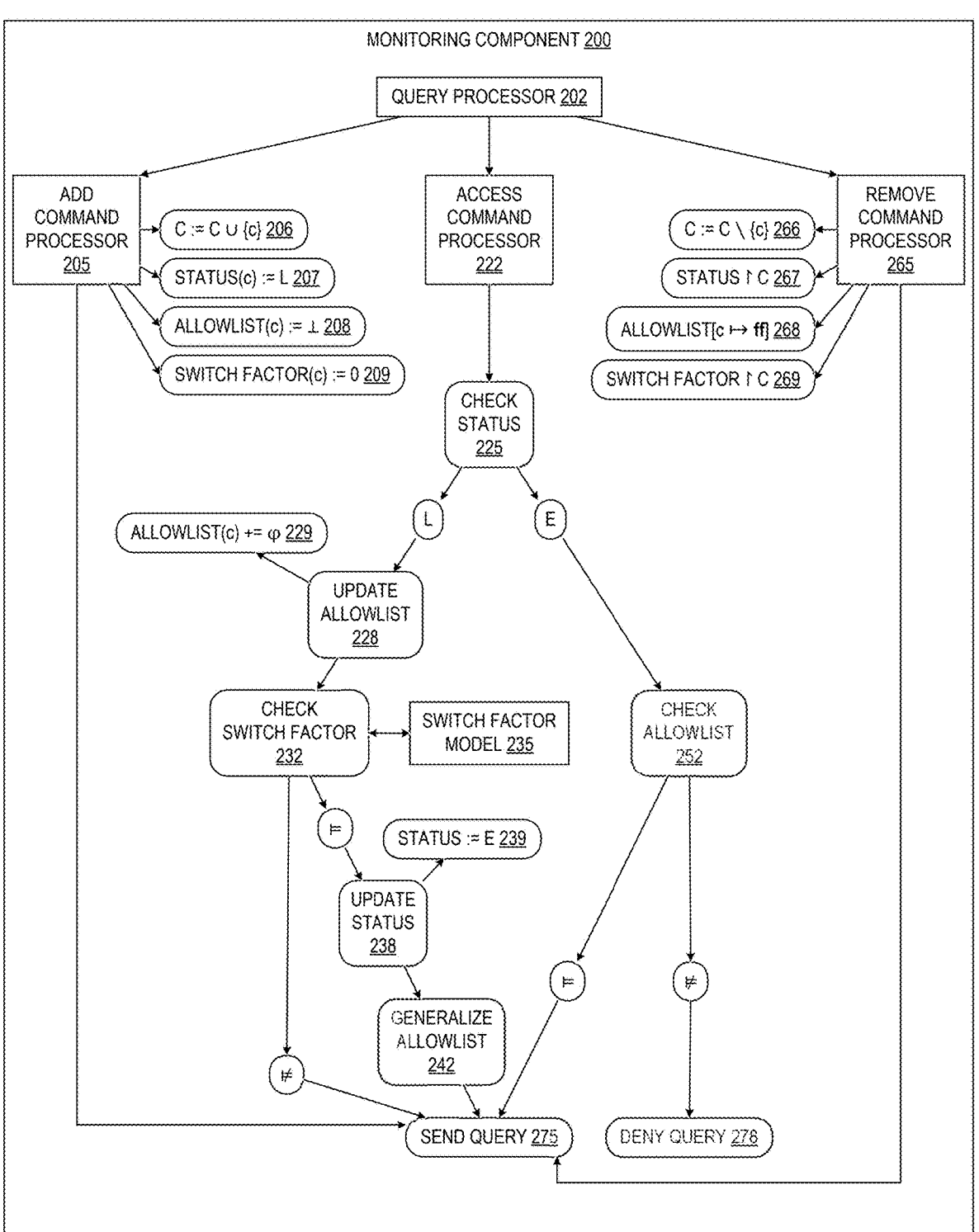

Embodiments of the disclosure implement incremental security protection generation. Instead of having a learning phase pedantically followed by an enforcement phase, embodiments of the disclosure may flexibly incorporate multiple learning phases triggered by the addition of columns to a database. The adjustment to the learning phase as detailed below forms a practical improvement to computing systems and databases, especially over those that do not implement incremental security protection through adjusted learning phases.

In an embodiment, a monitoring component performing runtime application self-protection (RASP) monitors the communication between an application and a database. While monitoring the communication, the monitoring component may reinitiate a learning phase for columns that are added to the database while maintaining an enforcement phase for preexisting columns. The learning phase may be tracked with a status that indicates whether a column is in the learning phase (which may add predicates to the allowlists for the added columns) or the enforcement phase (which may check commands accessing the added columns against the allowlists generated during the learning phase).

During the learning phase for one of the added columns, the monitoring component may generate an allowlist that includes predicates from queries that access the added columns during the learning phase. A switch factor, for the added column, may be monitored against a switch factor threshold to determine when to switch the status of the added column from the learning phase to the enforcement phase.

Turning to FIG. 1, the system (100) is a computing system that operates to provide incremental security protection for the database (105). The components of the system (100) may each include one or more processors and one or more memories with data and instructions in accordance with the computing systems described in FIG. 7A and FIG. 7B. The system (100) includes the server (152) that communicates with the repository (102) and the user devices A (180) and B (185) through N (190).

The repository (102) is a collection of storage devices (e.g., file systems, databases, data structures, etc.) that store and maintain the data used by the system (100). The repository (102) may include multiple different, potentially heterogenous, storage devices. The repository (102) stores data utilized by other components of the system (100). The data stored by the repository (102) includes the database (105), the query data (120), status data (122), the allowlist data (125), and the switch factor data (128).

The database (105) is a structured collection of data stored and accessed electronically, designed to efficiently manage and retrieve data. The database (105) enables users and applications to perform operations, which may include querying, updating, and managing information systematically. Databases are used in many fields where large amounts of data are handled.

The database (105) stores data, which can include text, numbers, images, videos, etc. The database (105) includes software (which may be referred to as a database management system (DBMS)) that interacts with and exposes the data within the database (105) to other applications, programs, and systems. The database (105) provides tools to define, create, maintain, and control access. Examples of the database (105) include MySQL, PostgreSQL, Oracle Database, Microsoft SQL Server, MongoDB, etc.

As an example, the database (105) may be a relational database and include the tables (108). A schema may define the structure of the database (105), including the tables (108), fields, relationships, etc. Queries are used to request data or information from the database (105). The queries may be formed using a query language (e.g., structured query language (SQL)). Indexes within the database (105) may be used to improve the speed of data retrieval operations. Transactions may be used for accessing the data within the database (105) so that a sequence of database operations is treated as a single unit to maintain data integrity.

Different types of databases may be used. NoSQL databases, designed for specific data models such as document, key-value, graph, or wide-column stores, may utilize flexible schemas and handle large volumes of unstructured data. NewSQL databases may provide the scalability of NoSQL while maintaining the atomicity, consistency, isolation, and durability (ACID) properties of relational databases. In-memory databases store data in the main memory rather than on persistent storage for faster access times.

The tables (108) store data within the database (105). The tables (108) include rows and the columns (110). Each row may represent a record in the database (105). Each of the columns (110) may represent a field or an attribute within the records. The design of each of the tables (108) may be defined by a corresponding schema. Each schema may define the structure and types of data that may be stored within one of the tables (108). A schema may include the names of the columns, the data types for each column (such as integers, strings, dates, etc.), and rules that may be apply to one of the tables (108). Rules may include the identification of primary keys and foreign keys. A primary key is a unique identifier for each row in the table so that no two rows have the same key value, while foreign keys establish relationships between tables, enabling the database (105) to maintain referential integrity.

The columns (110) in the tables (108) of the database (105) are data structures within the tables (108) that define the attributes or fields for the data stored in the tables (108). Each of the columns (110) includes a name and a defined data type, which identifies the type of data may be stored within the column. Data types may include integers, floating point values, strings, dates, vectors, boolean values, JavaScript object notation (JSON) objects, images, etc.

The use of the terms "table", "row", and "column" do not refer to a particular type of data structure or type of database. A database may be implemented using a variety of data structures and a variety of types of databases exist. For the purposes of the application, the term "column" corresponds to an attribute or field of the records, and the term "row" corresponds to a record regardless of how the database is implemented.

In an embodiment, the database (105) may include a metadata table in the tables (108) that may store the status data (122) and the switch factor data (128) for the columns in the tables (108) of the database (105). Each row of the metadata table may identify one of the columns (110) in the database (105) and each column of the metadata table may store values for the status, switch factor, allowlist, etc., of the columns (110). Other types of metadata tables may be used. For example, another metadata table may have rows that correspond to queries received by the system (100) and the columns of the metadata table may include the metadata for the columns (110) of the database (105).

The query data (120) includes the information retrieved from a database and the queries used to obtain the information. A query is a formal request made to the database (105) to access specific data (e.g., from the columns (110)). A query may be constructed using various querying languages or mechanisms, which may be based on the type of database. In relational databases, structured query language (SQL) may be used, while non-relational databases may use other querying languages.

A query may be a set of commands or instructions that may identify the data to be retrieved (such as specific columns or fields). The commands or instructions may form predicates that may be used to filter or select retrieved data, and the sorting or grouping of the data. For example, the query "SELECT name, age FROM users WHERE age>30 ORDER BY age DESC" may be written in SQL for a relational database. The query requests the columns for the names and ages of users who are older than 30, with the results ordered by age in descending order. An access query may be a query with instructions to accesses data in a database. An add query may be a query with instructions to add data (e.g., a column) to a database. A remove query may be a query with instructions to remove data (e.g., a column) from a database.

The status data (122) includes information that defines the status of whether access to the information within the database (105) by the application (155) is in a learning phase or an enforcement phase. The status data (122) may include a value for each of the columns (110) that defines whether access to the column is in a learning phase (e.g. "L") or in an enforcement phase (e.g., "E"). During the learning phase, predicates are gathered from queries and collected into allowlists that define acceptable access patterns and behaviors to the database (105) from the application (155). During the enforcement phase, the allowlists generated during the learning phase are enforced to prevent access to the database (105) that is outside the scope of the patterns and behaviors observed during the learning phase and recorded in the allowlists.

The allowlist data (125) includes information that defines acceptable access behavior between the application (155) and the database (105). The allowlist data (125) may include an allowlist for each of the columns (110). An allowlist for a column may include the predicates from queries that accessed the column.

The switch factor data (128) includes information that defines when access to one of the columns (110) transitions from the learning phase to the enforcement phase. The data defining when access transitions from the learning phase to the enforcement phase is referred to as switch factor. A switch factor may be a scalar value compared to a switch factor threshold to determine when to transition (or "switch") from the learning phase to the enforcement phase. Both the switch factor (e.g., for a column) and the switch factor threshold may be stored in the switch factor data (128). Different criteria may be used as the basis for a switch factor. A switch factor may be measured by the number of queries received for the database (105), the number of queries received for one of the columns (110) of the database (105), the number of queries received since one of the columns (110) was added to the database (105), the length of time since one of the columns (110) was added to the database (105), etc. Additionally, mathematical models, including machine learning models, may be utilized to generate the switch factor data (128) to determine when to switch from the learning phase to the enforcement phase.

The server (152) is a collection of one or more computing systems that communicate with the repository (102) and the user devices A (180) through N (190). The server (152) may be operated to execute the application (155), which accesses the database (105).

The application (155) is a software application or software program. The application (155) is a component of the server (152) that includes a set of instructions (also referred to as code) that, when executed by the server (152), perform specific tasks and operations. The instructions are written in programming languages, which may include Python, JavaScript, Java, C++, C #, Ruby, etc. The application (155) uses queries (stored in the query data (120)) to access data in the columns (110) of the tables (108) of the database (105).

In an embodiment, the application (155) may access the database (105) using an application programming interface (API). For example, written in Java, the application may use the Java Database Controller (JDBC) API to interact with the database (105).

The monitoring component (158) is a component of the server (152) that provides runtime application self-protection (RASP). The monitoring component (158) integrates security measures directly into the runtime environment of the application (155) to create a protective layer that operates within the application (155). Implementation of the monitoring component (158) may include embedding a security agent or module within the application (155) or the runtime environment of the application (155).

The monitoring component (158) provides protective functions by continuously observing the interactions of the application (155) including user inputs, application programming interface (API) calls, queries to the database (105), etc. The monitoring component (158) may utilize a combination of predefined rules, behavioral analysis, and machine learning techniques to detect suspicious activities or anomalies to identify and attenuate potential threats or malicious activities. In an embodiment, the monitoring component (158) may intercept the queries from the application (155) to the database (105). The monitoring component (158) includes the query processor (160).

The query processor (160) is a component that operates on the server (152). The query processor (160) processes the queries the application (155) intercepted by the monitoring component (158). The intercepted queries may be processed using the status data (122), the allowlist data (125), and the switch factor data (128). The query processor (160) may update and use the status data (122) to determine if one of the columns (110) accessed by a query is in a learning phase or an enforcement phase. The query processor (160) may update and use the allowlist data (125) by adding and removing allowlists and predicates from the allowlist data (125) and using the allowlists to determine if a query should be denied. The query processor (160) may update and use the switch factor data (128) to determine when to change the status of one of the columns (110) from the learning phase to the enforcement phase. In an embodiment, the query processor (160) may include the switch factor model (162).

The switch factor model (162) is a component that operates on the server (152). The switch factor model (162) may update the switch factor data (128) based on changes to the columns (110) of the tables (108) of the database (105). In an embodiment, the switch factor model (162) may be a machine learning model. The input of the switch factor model (162) may be an input that includes an updated schema for one of the tables (108) to which one of the columns (110) is added (which may be referred to as an incremental column). The output of the switch factor model (162) may include one or more switch factor thresholds. The switch factor thresholds output may be stored in the switch factor data (128). Switch factor thresholds generated by the switch factor model may be customized to the incremental column to reduce the length of time that the status of the incremental column remains in the learning phase. Reducing the time of the learning phase reduces the amount of computational resources used by the learning phase. Further, in an embodiment in which the system is not blocking access to the added column during the learning phase, reducing the time of the learning phase increases the security of the system with respect to the column.

As an example, the switch factor model (162) may receive a schema, written in a programming language. The schema may be processed with a language model, as a part of the switch factor model (162), to convert the programming language instructions to embedding vectors that semantically encode the language from the schema. The embedding vectors may be passed through a transformer model, which may be part of the switch factor model (162), that outputs vectors which may be converted to text. The output vectors may be processed with a linear layer in the switch factor model (162) to identify values for the switch factor thresholds. When text is output from the language model, the text may include the values for the switch factor thresholds, which may be extracted and saved to the switch factor data (128).

The machine learning models used by the system (100) may include neural networks and may operate using one or more layers of weights that may be sequentially applied to sets of input data, which may be referred to as input vectors. For each layer of a machine learning model, the weights of the layer may be multiplied by the input vector to generate a collection of products, which may then be summed to generate an output for the layer that may be fed, as input data, to a next layer within the machine learning model. The output of the machine learning model may be the output generated from the last layer within the machine learning model. Multiple machine learning models may operate sequentially or in parallel. The output may be a vector or scalar value. The layers within the machine learning model may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model. Different types of machine learning algorithms may be used, including regression, decision trees, random forests, support vector machines, clustering, classifiers, principal component analysis, gradient boosting, etc.

The machine learning models may be trained by inputting training data to a machine learning model to generate training outputs that are compared to expected outputs. For supervised training, the expected outputs may be labels associated with a given input. For unsupervised learning, the expected outputs may be previous outputs from the machine learning model. The difference between the training output and the expected output may be processed with a loss function to identify updates to the weights of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

Continuing with FIG. 1, the user devices A (180) and B (185) through N (190) may interact with the server (152). The user devices A (180) and B (185) through N (190) may be computing systems in accordance with FIG. 7A and FIG. 7B. The user devices A (180) and B (185) through N (190) may include and execute the user applications A (182) and B (188) through N (192).

The user applications A (182) and B (188) through N (192) are programs that operate on the user devices A (180) and B (185) through N (190) to provide user interaction by collecting user inputs and displaying outputs in response to the user inputs. The user applications A (182) and B (188) through N (192) may include user interfaces with user interface elements to receive inputs and display outputs to the users of the system (100).

In an embodiment, the user device A (180) is operated by a user to interact with the application (155) and the data within the database (105). For example, the user may utilize a user interface to manipulate data within the database (105), which is displayed through the user device A (180). Responsive to the user interaction, the application (155) may add, update, and remove data and one or more of the columns (110) from the database (105). The queries used by the application (155) to manipulate the database (105) are monitored with the monitoring component (158), which may allow or deny the transmission of the queries to the database (105) based on the status data (122), allowlist data (125), and switch factor data (128).

In an embodiment, the user device N (190) may be operated by a developer of the system (100) to adjust the application (155) (or the database (105)). The adjustments may add, update, or remove one or more of the columns (110) from the tables (108) of the database (105). Again, the queries used to manipulate the database (105) are monitored with the monitoring component (158), which may allow or deny transmission of the queries to the database (105) based on the status data (122), the allowlist data (125), and the switch factor data (128).

Although described within the context of a client server environment with servers and user devices, aspects of the disclosure may be practiced with a single computing system and application. For example, a monolithic application may operate on a computing system (100) to perform the same functions as one or more of the applications executed by the servers (152) and the user devices A (180) and B (185) through N (190).

Turning to FIG. 2, the data flow within the monitoring component (200) is illustrated. The monitoring component (200) may be an embodiment of the monitoring component (158) of FIG. 1. The monitoring component (200) may intercept a query from an application to a database and process the query using the query processor (202). The monitoring component may be configured to operate in real-time, while queries are being received and before or during being processed, in order to secure the database and prevent unauthorized exposure of data.

The query processor (202) may process each of the commands in the query. The commands from the query may be distributed to the add command processor (205), the access command processer (222), and the remove command processer (265) based on the type of command.

The add command processor (205) processes commands from a query that add columns to a database. An added column may be referred to as an incremental column. The operations executed by the add command processor (205) are illustrated in Blocks (206) through (209). After executing the operations of Blocks (206) through (209), Block (275) may be executed.

Block (206) includes the statement "$C:=C \cup \{c\}$". The statement executes to update the set of columns "C" to include the incremental column "c".

Block (207) includes the statement "STATUS(c):=L". The statement executes to initialize the status for the incremental column "c" to "L" to indicate the status of the incremental column "c" corresponds to the learning phase.

Block (208) includes the statement "ALLOWLIST(c):=⊥". The statement executes to initialize the allowlist for the incremental column "c" to a null value ("⊥").

Block (209) includes the statement "SWITCH FACTOR (c):=0". The statement executes to initialize the switch factor for the incremental column "c" to "0".

The access command processor (222) processes commands from a query that access columns of a database. The operations executed by the access command processor (222) are illustrated in Blocks (225) through (242).

Block (225) executes operations to check the status of a column. In an embodiment, the status of a column may be "L" or "E". The status "L" corresponds to a learning phase and indicates that the system is learning what the appropriate queries are for a given column. The status "L" corresponds to an enforcement phase indicating that the system is enforcing what was learned during the learning phase. If the status of the column resolves to "L", then Block (228) may be executed. If the status of the column resolves to "E", then Block (252) may be executed.

Block (228) executes operations to update the allowlist for the column. The operations that are executed may include those illustrated in Block (229).

Block (229) includes the statement "ALLOWLIST(c)+ $=\varphi$". The statement executes to add the predicate $\varphi$ to the predicates already stored in the allowlist for the column.

Block (232) executes operations to check the switch factor for a column. The switch factor may be checked by comparing the switch factor for the column to a switch factor threshold, which may also be for the column. If the switch factor satisfies the switch factor threshold (identified by the operator "|="), then Block (238) may be executed. If the switch factor does not satisfy the switch factor threshold (identified by the operator "|≠"), then Block (275) may be executed.

In an embodiment, checking the switch factor may include updating the switch factor before comparing the switch factor to a switch factor threshold. For example, if the switch factor is based on the number of queries received for a database (or for a table of the database, or for the column of the table of the database, etc.), then the switch factor that identifies the number of queries may be updated to identify the number of queries that the database has received. In an embodiment, updating the switch factor may be performed with the switch factor model (235).

The switch factor model (235) is a component that may update the value of the switch factor. In an embodiment, the switch factor model (235) may utilize one or more mathematical algorithms, including machine learning algorithms, to update the switch factor. The switch factor may be based on the number of queries received, the length of time since the column was created, the contents of the queries, combinations thereof, etc.

Block (238) executes operations to update the status of the column. The operations that are executed may include those illustrated in Block (239).

Block (239) includes the statement "STATUS:=E". The statement executes to change the status of the column from "L" to "E" to indicate that the status of the column will correspond to the enforcement phase the next time the status of the column is checked.

Block (242) executes operations to generalize the allowlist for the column. The allowlist may be generalized by combining the allowlist for a column with other allowlists of other columns that are also in the enforcement phase.

Block (252) executes operations to check the access command being processed against the allowlist for the column. The access command being processed includes a predicate that is checked against the scope of the predicates stored in the allowlist. For example, the access command may include the predicate "x>5" for values in the column that are greater than "5" and the relevant predicate of the allowlist may include "x>4". Since the predicate of the access command is within the scope of the predicate from the allowlist, the check of the allowlist is satisfied. When checking the allowlist is satisfied, Block (275) may execute. When checking the allowlist is not satisfied, then Block (278) may execute.

The remove command processor (265) processes commands from a query that remove columns from a database. The operations executed by the remove command processor (265) are illustrated in Blocks (266) through (269). After executing the operations of Blocks (266) through (269), Block (275) may be executed.

Block (266) includes the statement "C:=C\{c}". The statement executes to update the set of columns "C" to remove the column "c".

Block (267) includes the statement "STATUS ↾ C". The statement executes to update the set of columns "C" to remove the status for the column "c".

Block (268) includes the statement "ALLOWLIST[c ↦ ff]". The statement executes to map any predicates in the allowlist that include the column "c" to the value false ("ff").

Block (269) includes the statement "SWITCH FACTOR ↾ C". The statement executes to update the set of columns "C" to remove the factor for the column "c".

Block (275) executes operations to send the query being processed to a database. Each of the statements in a query may be processed before making the decision to send the query to the database.

Block (278) executes operations to deny the query being processed from being sent to the database. In an embodiment, if one statement from a query is denied, the entire query may be denied.

Figure 3:
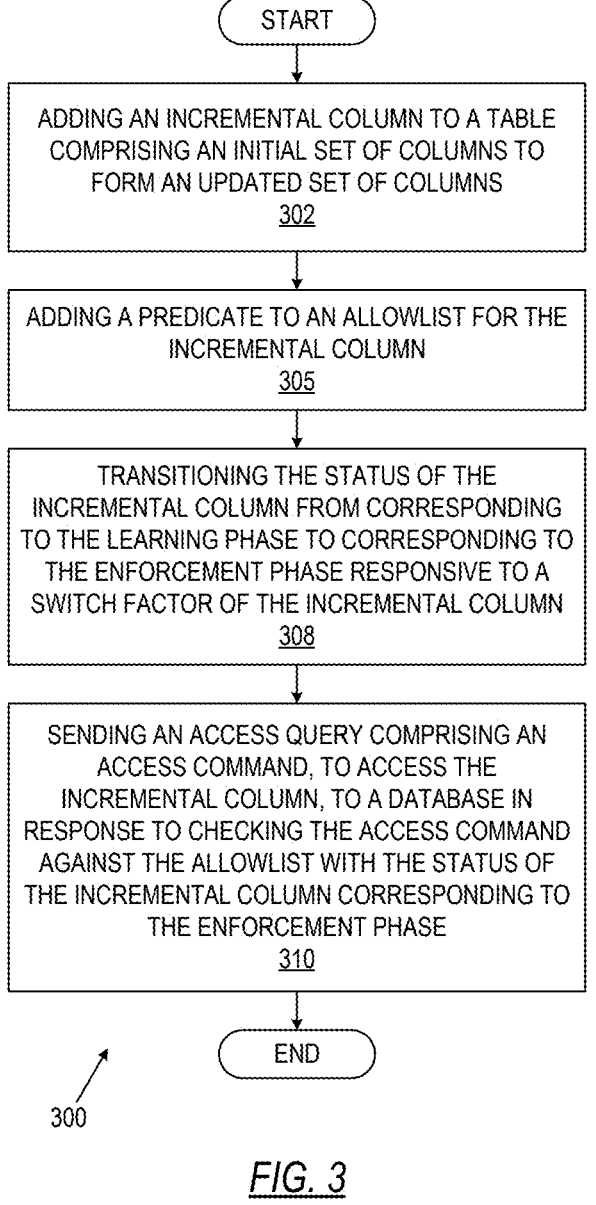
FIG. 3 shows a method in accordance with one or more embodiments of the disclosure.

FIG. 3 shows a flowchart of a method implementing incremental security protection generation. The method of FIG. 3 may be implemented using the system of FIG. 1, and one or more of the steps may be performed on, or received at, one or more computer processors. In an embodiment, a system may include at least one processor and an application that, when executing on the at least one processor, performs the method. In an embodiment, a non-transitory computer readable medium may include instructions that, when executed by one or more processors, perform the method. The outputs from various components (including models, functions, procedures, programs, processors, etc.) for performing the method may be generated by applying a transformation to inputs using the components to create the outputs without using mental processes or human activities.

Turning to FIG. 3, the process (300) may be part of the application that provides incremental security using statuses and switch factors of columns. The process (300) may include multiple steps (e.g., steps (302) through (310)) that may execute on the components described in the other figures, including those of FIG. 1. The process (300) may add an incremental column, which may later be removed.

Step (302) includes adding an incremental column to a table including an initial set of columns to form an updated set of columns. The initial set of columns includes a status for at least one column of the initial set of columns. The status for the at least column of the initial set of columns corresponds to an enforcement phase. The incremental column includes a status of the incremental column corresponding to a learning phase.

In an embodiment, adding the incremental column includes processing an add query to determine that the add query includes an add command to add the incremental column to the table of the database. The add query may include additional commands and statements to manipulate a database.

In an embodiment, adding the incremental column includes initializing the switch factor of the incremental column to an initial switch value in response to processing an add query. As an example, the initial switch value may be "0".

In an embodiment, adding the incremental column includes setting the status of the incremental column to correspond to the learning phase in response to processing an add query. As an example, the initial switch value may be "L".

In an embodiment, adding the incremental column includes initializing the allowlist for the incremental column to a null value. The null value indicates that no predicates have been detected that use the incremental column in the queries processed by the system.

In an embodiment, adding the incremental column includes sending the add query with the command to add the incremental column to the database. The query is sent to the database for the database itself to add the incremental column. As an example, the query may be processed with an API that exposes, but is not part of, the database. As such, the incremental column will not be added to the database unless the query is sent to the database.

Step (305) includes adding a predicate to an allowlist for the incremental column. The status of the incremental column corresponds to a learning phase and the status for the at least one column of the initial set of columns corresponds to the enforcement phase.

In an embodiment, adding the predicate to the allowlist includes processing a learning phase access query to determine that the learning phase access query comprises a learning phase access command (e.g., an access command received during a learning phase) to access the incremental column. The learning phase access query is a query that accesses the incremental column during the learning phase for the incremental column. In an embodiment, the queries may be written in structured query language (SQL) and the following commands may be identified as access commands. The 'SELECT' command retrieves data from one or more columns in a table. The 'SELECT DISTINCT' command retrieves unique values from a column. The 'WHERE' clause filters records based on a condition applied to a column. The 'ORDER BY' clause sorts the result set based on values in one or more columns. The 'GROUP BY' clause groups rows with the same values in specified columns into summary rows. The 'HAVING' clause filters groups based on a condition, often used with 'GROUP BY'. The 'JOIN' command retrieves related data from multiple tables based on a related column between them. The access commands may include other commands and may be written using different query languages.

In an embodiment, adding the predicate to the allowlist includes adding the predicate to the allowlist of the incremental column. If the allowlist for the incremental column already included one or more predicates, the predicate from the query may be appended to the current set of predicates using a logical or. For example, the instruction "ALLOW-LIST(c)+=$\varphi_{a2}$" when processed may update the allowlist represented by "a ↦ $\varphi_{a1}$" to include $\varphi_{a2}$ by appending $\varphi_{a2}$ with a logical or ("$\lor$"), as represented by "a ↦ $\varphi_{a1} \lor \varphi_{a2}$".

Step (308) includes transitioning the status of the incremental column from corresponding to the learning phase to corresponding to the enforcement phase responsive to a switch factor of the incremental column. As an example, the status of the incremental column, when in the learning phase, may be represented by the status having the value "L". The value of "L" may be changed to the value "E" to transition the status and indicate that the incremental column is in the enforcement phase.

In an embodiment, transitioning the status of the incremental column includes determining the status of the incremental column corresponding to the learning phase. In an embodiment, determination of the status may be performed by looking up the status for the column in a metadata table of the database that stores these statuses of the columns of the database.

In an embodiment, transitioning the status of the incremental column includes determining that the switch factor of the incremental column satisfies a switch factor threshold to form a switch factor determination using a processor to store the switch factor determination to a memory. Like any other operation performed by the system, the switch factor threshold and switch factor may be loaded from memory into registers of a processor. The processor may perform the comparison and store the result in a register which is then transferred back to memory. In an embodiment, the switch factor threshold is satisfied when the switch factor is greater than the switch factor threshold. Other types of comparisons may be used.

In an embodiment, transitioning the status of the incremental column includes transitioning the status of the incremental column responsive to determining that the switch factor of the incremental column satisfies the switch factor threshold. For example, in response to determining that the switch factor threshold is satisfied, the status of the increment column may be transitioned.

In an embodiment, transitioning the status of the incremental column includes generalizing the allowlist of the incremental column. As an example, the allowlist for the incremental column may be generalized by consolidating the allowlist for the incremental column with the other allowlists for the other columns. The consolidation may reduce the amount of memory used to store the allowlist. For example, if two columns each include the predicate φ (e.g., "x>5"), then instead of storing the predicate twice, once for each column, the predicate may be stored once and referenced by the allowlists for both columns.

Step (310) includes sending an access query comprising an access command, to access the incremental column, to a database in response to checking the access command against the allowlist with the status of the incremental column corresponding to the enforcement phase. For example, after the incremental column has been added and the learning phase has been completed, the system may receive an enforcement phase access query with command to access the incremental column. The enforcement phase access query is a query to access a column during the enforcement phase. The system checks the predicates of the enforcement phase access query against the predicates of the allowlist to determine if the scope of the predicates of the allowlist include the scope of the predicates of the enforcement phase access query. When the scope of the predicates of the allowlist include the scope of the predicates of the enforcement phase access query, then the enforcement phase access query is sent to the database for processing to generate a result from the query.

In an embodiment, the process (300) includes updating the switch factor of the incremental column in response to receiving a query and determining the status of the incremental column corresponds to the learning phase. For example, when the switch factor is query based, the switch factor may be incremented when a query is received. When the switch factor is time based, the switch factor may be updated based on the current time.

In an embodiment, a switch factor model may use multiple types of data for input and output for the value of the switch factor. As an example, the switch factor model may be a machine learning model that operates using a neural network algorithm, a random forest algorithm, a decision tree algorithm, etc. The inputs may include the number of queries received by the system since the column was added, the amount of time since the column was added, and the text from the queries received since the column was added. Additional inputs may be used. The switch factor model may process the inputs with multiple layers to generate a scalar value output that is the update to the switch factor (or the updated switch factor).

In an embodiment, a language model may process the text of the queries and output an updated switch factor. The language model may utilize multiple transformer layers and form a large language model. The prompt to the language model may specify that the language model is to analyze the query in comparison with other queries, provided in the prompt, as well as with the data describing the number of queries received and the amount of time since the column was added and generate the updated value for the switch factor as an output from the language model. The updated switch factor may then be used to determine whether to switch from the learning phase to the enforcement phase.

In an embodiment, the process (300) includes removing the incremental column from the table. The process of removing the incremental column may be performed with multiple steps.

In an embodiment, removing the incremental column includes processing a remove query to determine that the remove query includes a remove command to remove the incremental column. The remove query is a query that includes a command to remove the incremental column from the database. The remove query may include additional commands and statements.

In an embodiment, removing the incremental column includes removing the incremental column from the updated set of columns to form a subsequent set of columns. In an embodiment, the incremental column may be removed from the database by deleting the reference to the column from the database.

In an embodiment, removing the incremental column includes removing the switch factor of the incremental column. The switch factor may be removed by deleting the switch factor from the data structure storing the switch factors for the columns of the database.

In an embodiment, removing the incremental column includes removing the status of the incremental column. The status may be removed by deleting the status from the data structure storing the statuses for the columns of the database.

In an embodiment, removing the incremental column includes removing the allowlist for the incremental column. The allowlist may be removed by deleting the allowlist from the data structure that stores the allowlists in the database.

In an embodiment, removing the incremental column includes adjusting a set of predicates referencing the incremental column in a set of allowlists for the subsequent set of columns. Even though the allowlist for the incremental column may have been removed, predicates for the other columns of the database may still reference the incremental column that is being removed. To prevent the predicates of the remaining allow lists from referencing the removed column, values for the predicates may be adjusted. In an embodiment, predicates that reference the removed incremental column are set to false ("ff").

In an embodiment, the process (300) includes displaying a metadata table with the status for the at least one column of the initial set of columns prior to adding the predicate. The metadata table may display multiple types of information, including the status, switch factor, allowlist, etc., for each column in the database. The display of the metadata table may be updated in real time in response to the system processing queries during the display of the metadata table.

In an embodiment, the process (300) includes displaying a metadata table with the allowlist and the status for the at least one column of the updated set of columns after adding the predicate. For example, after a query is received, the predicate from the query may be added to the allowlist for a column and the display of the metadata table may be updated in real time with the adjusted allow list for the column.

Turning to FIG. 4, the metadata table (400) may be displayed in a user interface on a user device. The metadata table (400) displays metadata for the columns of the table (499) of a database. The columns of the metadata table (400) may be different than the columns of the table (499) of the database. The table (499) is depicted as initiated with columns "a" and "b". The columns "c" and "d" are later added to the table (499) and the column "C" is later removed.

The columns of the metadata table (400) display different types of information for the inquiries that correspond to the rows of the metadata table (400). The query column with the cells (401), (409), (417), (425), (433), (441), (449), (457), (465), (473), and (481) displays the text of the queries received by the system. The switch factor column with the cells (403), (411), (419), (427), (435), (443), (451), (459), (467), (475), and (483) displays the switch factors for the columns of the table (499). The allowlist column with cells (405), (413), (421), (429), (437), (445), (453), (461), (469), (477), and (485) displays the allowlists for the columns of the table (499). The status column with the cells (407), (415), (423), (431), (439), (447), (455), (463), (471), (479), and (487) displays the status of the columns of the table (499).

The rows of the metadata table (400) correspond to different queries received by the system. The row with the cells (401), (403), (405), and (407) is a header row. The information in the cells of the header row identify the type of information within the columns of the metadata table (400).

The row with the cells (409), (411), (413), and (415) show updates to the metadata table (400). In an embodiment, the updates are in response to the query (in the cell (409)) being received and processed by the monitoring component.

The cell (409) shows that the query received includes the statement "SELECT a $\varphi_{a1}$". The statement of the query accesses column "a" using the predicate "$\varphi_{a1}$".

The cell (411) shows the switch factors for the columns of the table (499) as "(1, 1, ⊥, ⊥)", which correspond to the columns "a", "b", "c", and "d". The switch factors for columns "a" and "b" of the table (499) are "1" (i.e., one query has been received). The switch factors for columns "c" and "d" are null ("⊥") since columns "c" and "d" have not been added to the table (499) at the time the query of the cell (409) was received.

The cell (413) shows the allowlists for the columns of the table (499). After the query of the cell (409) is received, the allowlist for column "a" of the table (499) is "a ↦ $\varphi_{a1}$", which is updated to include the predicate "$\varphi_{a1}$" from the query of the cell (409).

The cell (415) shows the statuses for the columns of the table (499). After the query of the cell (409) is received, the statuses for the columns "a" and "b" are identified as "L" to indicate that the columns "a" and "b" are in the learning phase. The statuses of the columns "c" and "d" of the table (499) are null ("⊥") since the columns "c" and "d" have not yet been added to the table (499).

The row with the cells (417), (419), (421), and (423) show updates to the metadata table (400) after the query shown in the cell (417) is received. The query accesses column "b" of the table (499) using the predicate "$\varphi_b$". The statuses of the columns "a" and "b" (shown in the cell (419)) are updated to "2" (indicating that two queries have been received). The allowlists are updated to "a ↦ $\varphi_{a1}$, b ↦ $\varphi_b$" to show the allowlist for column "a" has not changed and the allowlist for column "b" is updated to "b ↦ $\varphi_b$" to include the predicate "$\varphi_b$".

The row with the cells (425), (427), (429), (431) show updates to the metadata table (400) after the query shown in the cell (425) is received. The column "c" is added to the table (499). The switch factor (shown in the cell (427)) for the column "c" is updated to "3" since the query to add the column "c" was received during the initial learning phase. The status of the column "c" is "L" to indicate it is in the learning phase.

The row with the cells (433), (435), (437), and (439) show updates to the metadata table (400) after the query shown in the cell (433) is received. The query (shown in the cell (433)) accesses column "a" with the predicate "$\varphi_{a2}$". The switch factors (shown in the cell (435)) are updated to "4", which is equal to the switch factor threshold.

The allowlists are updated with the allowlist for column "a" being appended with the predicate "$\varphi_{a2}$" using a logical or ("∨"), shown as "a ↦ $\varphi_{a1}$ ∨ $\varphi_{a2}$". The allowlist for column "c" is mapped to false ("c ↦ _ff_") as there were no accesses to the column "c" during the initial learning phase.

With the switch factors reaching the switch factor threshold, the statuses of the columns "a", "b", and "c" are updated to "E". The status of "E" indicates the columns "a", "b", and "c" are each in the enforcement phase for the next query received.

The row with the cells (441), (443), (445), and (447) show updates to the metadata table (400) after the query shown in the cell (441) is received. The query adds the column "d" to the table (499), updates the switch factor of the column "d" to "0", and updates the status of the column "d" to "L" for a learning phase. The query adding the column "d" was received after the initial learning phase so that a new learning phase for the column "d" may be started while the other columns "a", "b", and "c" are in the enforcement phase.

The row with the cells (449), (451), (453), and (455) show updates to the metadata table (400) after the query shown in the cell (449) is received. The query ("SELECT a $\phi_1$") accesses the column "a" with the predicate $\phi_1$. The predicate from the query is compared with the predicates from the allowlist ("a ↦ $\varphi_{a1}$ ∨ $\varphi_{a2}$") for the column "a" to determine whether the query will be denied or be sent to the database to access the table (499) and the column "a". The query will be denied when the predicate from the query is not within the scope of the predicates from the allow list. Otherwise, the query will be allowed and passed on to the database. The switch factor for the column "d" (shown in the cell (451)) is updated to "1" indicating that one query has been received since the column D was added to the table (499).

The row with the cells (457), (459), (461), and (463) show updates to the metadata table (400) after the query shown in the cell (457) is received. The query accesses the column "b" using a predicate ("$\phi_2$") that will be compared to the allow list for the column "b". The switch factor for the column "d" (shown in the cell (459)) is updated to "2".

The row with the cells (465), (467), (469), and (471) show updates to the metadata table (400) after the query shown in the cell (465) is received. The query attempts to access the column "c" with the predicate "$\phi_3$". The query will be denied since the allowlist for column "c" is mapped to false ("c ↦ ff").

The row with the cells (473), (475), (477), and (479) show updates to the metadata table (400) after the query shown in the cell (473) is received. The query accesses the column "d" at the last moment of the learning phase for the column "d". For the column "d", the switch factor is updated to "4" (which is equal to the switch factor threshold), the allow list for "d" is updated (to "d ↦ $\varphi_d$"), and the status of the column "d" is updated to "E" for the enforcement phase.

The row with the cells (481), (483), (485), and (487) show updates to the metadata table (400) after the query shown in the cell (481) was received. The query drops the column "c" from the table (499) and removes the switch factor, allowlist, and status for the column "c". The allowlists for the remaining columns may be updated to set any predicates that depended on the column "c" to false.

Turning to FIG. 5, the metadata table (500) may be displayed in a user interface on a user device. The metadata table (500) displays metadata for the columns of the table (599) of a database. The columns of the metadata table (500) may be different than the columns of the table (599) of the database.

The query column with the cells (501), (509), (517), (525), (533), (541), (549), (557), (565), (573), (581), and (589) displays the text of the queries received by the system. The switch factor column with the cells (503), (511), (519), (527), (535), (543), (551), (559), (567), (575), (583), and (591) displays the switch factors for the columns of the table (599). The allowlist column with cells (505), (513), (521), (529), (537), (545), (553), (561), (569), (577), (585), and (593) displays the allowlists for the columns of the table (599). The status column with the cells (507), (515), (523), (531), (539), (547), (555), (563), (571), (579), (587), and (595) displays the status of the columns of the table (599).

The table (599) is depicted as initiated with columns "a" and "b". The column B is removed with the query of the cell (517). The column "c" is added with the query of the cell (533). The column "d" is added with the query of the cell (549). The column "d" is removed with the query of the cell (581).

The switch factor is time based with a switch factor threshold of 11 time units before switching a column from the learning phase to the enforcement phase. The initial learning phase applies to all columns. After the initial learning phase transitions to the enforcement phase for all columns, supplemental learning phases may be started for columns added to the table after the end of the initial learning phase. The initial learning phase ends at time unit 11, which corresponds with the timing of the receipt of the query of the cell (541). The column "d" is added after the initial learning phase has ended. The column "c" is not accessed after being added and has no allowlist. The "CRE- ATE VIEW" statement of the query of the cell (589) is a type of statement that was not received during a learning phase and will be denied.

Turning to FIG. 6, the metadata table (600) may be displayed in a user interface on a user device. The metadata table (600) displays metadata for the columns of the table (699) of a database. The columns of the metadata table (600) may be different than the columns of the table (699) of the database.

The query column with the cells (601), (609), (617), (625), (633), (641), (649), and (657) displays the text of the queries received by the system. The switch factor column with the cells (603), (611), (619), (627), (635), (643), (651), and (659) displays the switch factors for the columns of the table (699). The allowlist column with cells (605), (613), (621), (629), (637), (645), (653), and (661) displays the allowlists for the columns of the table (699). The status column with the cells (607), (615), (623), (631), (639), (647), (655), and (663) displays the status of the columns of the table (699).

The table (699) includes the columns "a", "b", and "c". Each of the columns has an independent switch factor threshold. As indicated in the cell (603), the switch factor for column "a" is "1", for column "b" is "2", and for column "c" is "1". The switch factor for each column is based on the column query count. In other words, the switch factor for a column increments when a query interacts with the column.

The query of the cell (609) initializes the table (699). Each of the columns of the table (699) are initialized with null switch factors, empty allow lists, and statuses of "L" (learning phase).

Upon receiving the query shown in the cell (617), the switch factor for the column "a" is updated to "1", the allowlist for the column "a" is updated to include the predicate "$\varphi_{a1}$", and the status of the column "a" is transitioned to "E" (enforcement phase) since the switch factor of the column "a" upon receiving the query (of the cell (617)) is equal to the switch factor threshold for the column "a". The column "a" is accessed with the query of the cell (633) with the predicate "$\varphi_{a1}$", which is compared to the predicate of the allow list for the column "a" (shown in the cell (637)).

For the column "b", the allowlist of the column "b" is updated with the queries at the cells (625) and (641). The column "b" is transitioned to the enforcement phase after receiving the second query (of the cell (641)). The column "b" is accessed with the query of the cell (649) with the predicate "$\phi_{b1}$", which is compared to the predicates of the allowlist for the column "b" (shown in the cell (653)).

For the column "c", the allowlist of the column "c" is updated with the query at cell (657). The column "c" is transitioned to the enforcement phase after receiving the first query shown in the cell (659).

Embodiments may be implemented on a special purpose computing system specifically designed to achieve the improved technological result. Turning to FIG. 7A and FIG. 7B, the special purpose computing system (700) may include one or more computer processors (702), non-persistent storage (704), persistent storage (706), a communication interface (712) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) may be one or more cores or micro-cores of a processor. The computer processor(s) (702) includes one or more processors. The one or more processors may include a central processing unit (CPU), a graphics processing unit (GPU), a tensor processing unit (TPU), combinations thereof, etc.

The input devices (710) may include a touchscreen, keyboard, mouse, microphone, touchpad, electronic pen, or any other type of input device. The input devices (710) may receive inputs from a user that are responsive to data and messages presented by the output devices (708). The inputs may include text input, audio input, video input, etc., which may be processed and transmitted by the computing system (700) in accordance with the disclosure. The communication interface (712) may include an integrated circuit for connecting the computing system (700) to a network (not shown) (e.g., a local area network (LAN), a wide area network (WAN) such as the Internet, mobile network, or any other type of network), and/or to another device, such as another computing device.

Further, the output devices (708) may include a display device, a printer, external storage, or any other output device. One or more of the output devices (708) may be the same or different from the input device(s) (710). The input devices (710) and the output device(s) (708) may be locally or remotely connected to the computer processor(s) (702). Many different types of computing systems exist, and the aforementioned input devices (710) and output device(s) (708) may take other forms. The output devices (708) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (700) in FIG. 7A may be connected to or be a part of a network. For example, as shown in FIG. 7B, the network (720) may include multiple nodes (e.g., node X (722) and node Y (724)). Each node may correspond to a computing system, such as the computing system (700) shown in FIG. 7A, or a group of nodes combined may correspond to the computing system (700) shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722) and node Y (724)) in the network (720) may be configured to provide services for a client device (726), including receiving requests and transmitting responses to the client device (726). For example, the nodes may be part of a cloud computing system. The client device (726) may be a computing system, such as the computing system (700) shown in FIG. 7A. Further, the client device (726) may include and/or perform all or a portion of one or more embodiments of the disclosure.

The computing system (700) of FIG. 7A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an "or" may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above may be devised which do not depart from the scope of the claims as disclosed herein. Accordingly, the scope should be limited only by the attached claims.

What is claimed is:

1. A method comprising:
adding an incremental column to a table comprising an initial set of columns to form an updated set of columns, wherein the initial set of columns comprises a status for at least one column of the initial set of columns, wherein the status for the at least one column of the initial set of columns corresponds to an enforcement phase, and wherein the incremental column comprises a status of the incremental column corresponding to a learning phase;
adding a predicate to an allowlist for the incremental column, wherein the status of the incremental column corresponds to the learning phase and the status for the at least one column of the initial set of columns corresponds to the enforcement phase;
transitioning the status of the incremental column from corresponding to the learning phase to corresponding to the enforcement phase responsive to a switch factor of the incremental column;
sending an access query comprising an access command, to access the incremental column, to a database in response to checking the access command against the allowlist with the status of the incremental column corresponding to the enforcement phase; and
removing the incremental column from the table, wherein removing the incremental column comprises:
processing a remove query to determine that the remove query comprises a remove command to remove the incremental column, and
adjusting a set of predicates referencing the incremental column in a set of allowlists for the subsequent set of columns.

2. The method of claim 1, wherein adding the incremental column comprises:
processing an add query to determine that the add query comprises an add command to add the incremental column to the table of the database.

3. The method of claim 1, wherein adding the incremental column comprises:
initializing the switch factor of the incremental column to an initial switch value in response to processing an add query.

4. The method of claim 1, wherein adding the incremental column comprises:
setting the status of the incremental column to correspond to the learning phase in response to processing an add query.

5. The method of claim 1, wherein adding the incremental column comprises:
initializing the allowlist for the incremental column to a null value; and
sending an add query with an add command to add the incremental column to the database.

6. The method of claim 1, wherein adding the predicate to the allowlist comprises:
processing a learning phase access query to determine that the learning phase access query comprises a learning phase access command to access the incremental column; and
adding the predicate to the allowlist of the incremental column.

7. The method of claim 1, wherein transitioning the status of the incremental column comprises:
determining the status of the incremental column corresponds to the learning phase;
determining the switch factor of the incremental column satisfies a switch factor threshold to form a switch factor determination using a processor to store the switch factor determination to a memory;
transitioning the status of the incremental column responsive to determining that the switch factor of the incremental column satisfies the switch factor threshold; and
generalizing the allowlist of the incremental column.

8. The method of claim 1, further comprising:

updating the switch factor of the incremental column in response to receiving a query and determining the status of the incremental column corresponds to the learning phase.

9. The method of claim 1, further comprising:

removing the incremental column from the table, wherein removing the incremental column comprises:

removing the incremental column from the updated set of columns to form a subsequent set of columns, removing the switch factor of the incremental column, removing the status of the incremental column, and removing the allowlist for the incremental column.

10. The method of claim 1, further comprising:

displaying a metadata table with the status for the at least one column of the initial set of columns prior to adding the predicate; and displaying the metadata table with the allowlist and the status for the at least one column of the updated set of columns after adding the predicate.

11. A system comprising:

at least one processor; and an application that, when executing on the at least one processor, performs operations comprising:

adding an incremental column to a table comprising an initial set of columns to form an updated set of columns, wherein the initial set of columns comprises a status for at least one column of the initial set of columns, wherein the status for the at least one column of the initial set of columns corresponds to an enforcement phase, and wherein the incremental column comprises a status of the incremental column corresponding to a learning phase, adding a predicate to an allowlist for the incremental column, wherein the status of the incremental column corresponds to the learning phase and the status for the at least one column of the initial set of columns corresponds to the enforcement phase, transitioning the status of the incremental column from corresponding to the learning phase to corresponding to the enforcement phase responsive to a switch factor of the incremental column, 1 sending an access query comprising an access command, to access the incremental column, to a database in response to checking the access command against the allowlist with the status of the incremental column corresponding to the enforcement phase, and removing the incremental column from the table, wherein removing the incremental column comprises:

processing a remove query to determine that the remove query comprises a remove command to remove the incremental column, and adjusting a set of predicates referencing the incremental column in a set of allowlists for the subsequent set of columns.

12. The system of claim 11, wherein adding the incremental column comprises:

processing an add query to determine that the add query comprises an add command to add the incremental column to the table of the database.

13. The system of claim 11, wherein adding the incremental column comprises:

initializing the switch factor of the incremental column to an initial switch value in response to processing an add query.

14. The system of claim 11, wherein adding the incremental column comprises:

setting the status of the incremental column to correspond to the learning phase in response to processing an add query.

15. The system of claim 11, wherein adding the incremental column comprises:

initializing the allowlist for the incremental column to a null value; and sending an add query with an add command to add the incremental column to the database.

16. The system of claim 11, wherein adding the predicate to the allowlist comprises:

processing a learning phase access query to determine that the learning phase access query comprises a learning phase access command to access the incremental column; and adding the predicate to the allowlist of the incremental column.

17. The system of claim 11, wherein transitioning the status of the incremental column comprises:

determining the status of the incremental column corresponds to the learning phase;

determining the switch factor of the incremental column satisfies a switch factor threshold to form a switch factor determination using a processor to store the switch factor determination to a memory;

transitioning the status of the incremental column responsive to determining that the switch factor of the incremental column satisfies the switch factor threshold;

and generalizing the allowlist of the incremental column.

18. The system of claim 11, wherein the application performs operations further comprising:

updating the switch factor of the incremental column in response to receiving a query and determining the status of the incremental column corresponds to the learning phase.

19. The system of claim 11, wherein the application performs operations further comprising:

removing the incremental column from the table, wherein removing the incremental column comprises:

removing the incremental column from the updated set of columns to form a subsequent set of columns, removing the switch factor of the incremental column, removing the status of the incremental column, and removing the allowlist for the incremental column.

20. A non-transitory computer readable medium comprising instructions executable by at least one processor to perform operations comprising:

adding an incremental column to a table comprising an initial set of columns to form an updated set of columns, wherein the initial set of columns comprises a status for at least one column of the initial set of columns, wherein the status for the at least one column of the initial set of columns corresponds to an enforcement phase, and wherein the incremental column comprises a status of the incremental column corresponding to a learning phase;

adding a predicate to an allowlist for the incremental column, wherein the status of the incremental column corresponds to the learning phase and the status for the at least one column of the initial set of columns corresponds to the enforcement phase;

transitioning the status of the incremental column from corresponding to the learning phase to corresponding to the enforcement phase responsive to a switch factor of the incremental column;

sending an access query comprising an access command, to access the incremental column, to a database in response to checking the access command against the allowlist with the status of the incremental column corresponding to the enforcement phase; and removing the incremental column from the table, wherein removing the incremental column comprises:

processing a remove query to determine that the remove query comprises a remove command to remove the incremental column, and adjusting a set of predicates referencing the incremental column in a set of allowlists for the subsequent set of columns.

\* \* \* \* \*